(12) United States Patent
Gehin et al.

(10) Patent No.: US 11,511,946 B2
(45) Date of Patent: Nov. 29, 2022

(54) TRANSFER OF PRODUCTS IN A GRIPPED MANNER TO OR FROM AN ACCUMULATION SURFACE

(71) Applicant: SIDEL ENGINEERING & CONVERING SOLUTIONS, Reichstett (FR)

(72) Inventors: Anthony Gehin, Reichstett (FR); Julien Berger, Reichstett (FR); Raphaël Henninger, Reichstett (FR)

(73) Assignee: SIDEL ENGINEERING & CONVERING SOLUTIONS, Reichstett (FR)

( * ) Notice: Subject to any disclaimer, the term of this patent is extended or adjusted under 35 U.S.C. 154(b) by 0 days.

(21) Appl. No.: 17/057,160

(22) PCT Filed: May 23, 2019

(86) PCT No.: PCT/EP2019/063355
§ 371 (c)(1),
(2) Date: Nov. 20, 2020

(87) PCT Pub. No.: WO2019/228901
PCT Pub. Date: Dec. 5, 2019

(65) Prior Publication Data
US 2021/0206583 A1    Jul. 8, 2021

(30) Foreign Application Priority Data

May 29, 2018  (FR) ...................................... 1854583

(51) Int. Cl.
*B65G 47/82* (2006.01)
*B65G 47/08* (2006.01)
(52) U.S. Cl.
CPC .......... *B65G 47/82* (2013.01); *B65G 47/088* (2013.01); *B65G 2201/0244* (2013.01)

(58) Field of Classification Search
CPC .... B65G 47/088; B65G 47/82; B65G 47/086; B65G 43/00; B65G 2201/0244
See application file for complete search history.

(56) References Cited

U.S. PATENT DOCUMENTS

| 4,756,400 A | * | 7/1988 | Funo ...................... B65B 35/10 198/429 |
| 10,442,635 B2 | | 10/2019 | Gehin et al. |

(Continued)

FOREIGN PATENT DOCUMENTS

| FR | 2993870 A1 | * | 1/2014 | ............. B65G 47/71 |
| FR | 2993870 A1 | | 1/2014 | |

(Continued)

OTHER PUBLICATIONS

Nini Luo, Insight Intellectual Property Attorneys, Mar. 30, 2022, 4 pages in toto (Year: 2022).*

(Continued)

*Primary Examiner* — Gene O Crawford
*Assistant Examiner* — Lester Ill Rushin (57) ABSTRACT

The invention relates to a method for transferring products to or from a collecting surface within a line for the continuous processing of said products, wherein a first transit zone is fed longitudinally with products by an entry conveyor; a second transit zone supplies products longitudinally to an exit conveyor; at least one column of products is transferred, by being pushed transversely, via a transfer tool provided with members disposed on either side of each column; wherein, at the moment of transfer, each column is gripped by said members being moved toward one another, a first member being fixed, while a second member is mounted in a movable manner. The invention also relates to a transfer device for implementing such a method.

20 Claims, 3 Drawing Sheets

(56) References Cited

U.S. PATENT DOCUMENTS

| | | | |
|---|---|---|---|
| 10,882,702 B2* | 1/2021 | Kirzinger | B65G 47/086 |
| 11,155,422 B2* | 10/2021 | Berger | B65G 47/5109 |
| 2021/0009360 A1* | 1/2021 | Mulet Valles | B65G 47/90 |
| 2021/0114817 A1* | 4/2021 | Choplin | B65G 47/244 |

FOREIGN PATENT DOCUMENTS

| | | | | |
|---|---|---|---|---|
| WO | 2012056145 A1 | 5/2012 | | |
| WO | WO-2012056145 A1 * | 5/2012 | | B65G 47/841 |
| WO | 2017140992 A1 | 8/2017 | | |
| WO | WO-2018015028 A1 * | 1/2018 | | B65G 47/086 |
| WO | 2018065721 A1 | 4/2018 | | |
| WO | WO-2019129968 A1 * | 7/2019 | | |

OTHER PUBLICATIONS

International search report dated Jul. 19, 2019.
Chinese Office Action dated Mar. 2, 2022, Chinese Patent Application No. 201980036367.X.
English Translation, Chinese Office Action dated Mar. 2, 2022, Chinese Patent Application No. 201980036367.X.

* cited by examiner

TRANSFER OF PRODUCTS IN A GRIPPED MANNER TO OR FROM AN ACCUMULATION SURFACE

The present invention lies in the field of the conveying of products within an industrial line for the continuous processing of said products, in particular for transferring products to or from a collecting surface.

Such products can be, in a nonlimiting manner, containers such as bottles, cans, cardboard cartons, or such containers grouped together in boxes, crates, cartons or bundles.

In a known way, such products are moved along said industrial line, between successive processing stations, by means of suitable conveyors, essentially of the endless belt type. In addition, said products are processed and conveyed in one file or in several parallel files, namely in a single-file line or a multi-file line. Moreover, during this conveying, the products in each file can be arranged in a specific manner, in particular in a spaced-apart and/or oriented manner.

Generally, in order to ensure the continuous production on such an industrial line, in spite of the stoppage at a processing station or because of different processing rates between two stations, one or more collecting zones for said products are provided, each collecting zone temporarily storing a variable amount of products between an upstream station and a downstream station with respect to said collecting zone.

In one particular configuration, such a collecting zone may be in the form of a collecting surface for receiving and moving said products, grouped together in columns, from an entry to an exit. Upstream, an entry conveyor feeds said collecting surface with one or more files of products at an entry edge via a first transit zone, while downstream, an exit conveyor receives one or more columns of products from said collecting surface via a second transit zone along its exit edge, which is situated on the opposite side from said entry edge.

In order to move the products to and from the collecting surface, first and second transit zones, disposed respectively upstream, between said entry conveyor and the collecting surface, and downstream, between said collecting surface and said exit conveyor, are provided. They ensure that the products circulate in a continuous flow, in spite of said products being transferred sequentially in columns respectively to and from the collecting surface, by pushing one or more columns in a transverse movement with respect to the longitudinal direction of circulation of the products.

It will be noted that, between the collecting surface and these transit zones, slider beds, made up of fixed surfaces on which the products are transferred, are often positioned.

A recurring constraint resides in this pushed transfer of the products in the first and second transit zones to or from said collecting surface, crossing interfaces between the different surfaces of said zones, in particular via the slider beds that constitute immovable intermediate surfaces. Specifically, even when flush with the collecting surface and the first or second transit zone, the junction with the slider bed entails the risk of the bottom of the products getting caught as they pass through at this point. Moreover, the accelerations and decelerations bring about collisions, which are liable to unbalance the products, or even make them fall over. Similarly, during the transfer onto each slider bed, the push causes rubbing of the products, a product then being liable to be shifted or once again to lose balance, to fall, or even to break in the case of a glass container. Moreover, the bringing of a member intended to effect said push into contact with the products can also cause a shock that unbalances said products at the moment of their transfer.

An existing solution consists in positioning an additional member, in parallel opposite the pushing member, in order to flank the column(s) of products to be transferred. In particular, the spacing between the members is determined depending on the width or the diameter of the products to be transferred. Such a spacing can be variable depending on the diameter of the products, but does not necessarily require a functional clearance to ensure the circulation of the products between the members when they are positioned on either side along a conveyor, for the one part, and in order to vertically move said tools, downwardly and upwardly, for the other part. Firstly, the functional clearance allows the transfer tool to cover the top of at least one column of products without touching them so as not to risk them falling over. Secondly, once the products have been transferred, said functional clearance allows the tool to be lifted so as to return to its original position in order to transfer further products. Such a clearance thus allows the tool be inserted and retracted at one or more columns of products, even if the products belonging to a single column are not perfectly aligned, this generally being the case in practice.

Thus, a first member situated on one side of a column of the products is spaced apart by a first distance while the member situated on the opposite side of said column is spaced apart by a second distance, said first and second distances constituting the abovementioned functional clearance.

Said functional clearance between the products and the members is provided in principle to be at least five millimeters, ranging up to thirty millimeters. Usually, said functional clearance is between ten and twenty millimeters.

Generally, this spacing is adjusted at the start of production, in particular depending on the dimensions and the shape of the products to be transferred, and is maintained throughout the production time. This adjustment is generally carried out by moving the members toward or away from one another. This operation is generally carried out upon each change of format of the products to be transferred. Consequently, after adjustment, this functional clearance is fixed and no longer modified.

However, while the necessary functional clearance makes it possible to prevent products from falling over while they are being transferred, it does not keep them in position while they are being transferred by a transverse movement, this being able to cause the orientation or position of one or more products to shift.

In particular, if products are shifted at the entry at the moment of the movement from the first transit zone to the collecting surface, the alignment of said products in a column is modified. This can result in a problem at the exit at the moment of transferring such a column of misaligned products from the collecting zone to the second transit zone. Specifically, the members may potentially strike and thus cause falls or even breakages of products in said column or in an adjacent column.

Moreover, the functional clearance causes an acceleration and especially a deceleration that are provided to be slow during the transverse movements. Specifically, these speeds depend on the products, on their weight and on their stability (due essentially to the shape of their bottom), generating, in a proportional manner, a coefficient of friction of the bottoms of the products on the surfaces. The slowness of the accelerations but especially of the decelerations makes it possible to maintain the alignment of the products in a column. It is thus impossible, with a functional clearance, to effect transfers at a high rate.

One solution is described in the document FR 2 993 870, in which the transfer of the products is accompanied by a tool in the form of jaws disposed on either side of the groups of products to be moved. The jaws are both provided to be mobile, so as to pass from a spaced-apart position to a position gripping the products, and vice versa.

While such a solution makes it possible to hold the products at the moment of their transfer, it has a drawback linked to the movements of the two jaws with respect to one another, this not ensuring that the products are aligned when they are released upon deposition. Moreover, the movements of the two jaws with respect to the arm and with respect to the products to be transferred are complex to manage.

The aim of the invention is to remedy the drawbacks of the prior art by proposing a method for transferring products that ensures improved holding of said products during their transverse movement. In particular, the invention envisions gripping each column of products between two members at the moment of their transfer, before or during the transverse movement. This gripping is provided such that said members move toward the products until they are within said functional clearance, or even until they come into contact with the lateral walls of the products, without otherwise applying a force thereto.

It should be noted, however, that in certain exceptional cases, in particular in the conveying of products with a wrapping that is not rigid, of the sachet or pouch type, it is possible to grip said products until a force is exerted, such as pinching.

Furthermore, the invention provides gripping with a tool provided with a fixed member and another member that is movable with respect to said fixed member. This other member that is movable with respect to the fixed member improves and facilitates the step of grasping the products to be transferred by gripping them.

Specifically, the member that is fixed transversely with respect to the tool then serves as a reference wall. This reference ensures in particular optimal alignment of the products while they are being transferred by especially at the moment they are released in order to be deposited: in this way, a perfectly straight line of products is obtained. Moreover, the fixed referencing with respect to the movable member considerably simplifies the onboard mechanism and makes it easier to manage the automation at the moment of gripping each column of products, and at the moment they are released, but especially if this operation is carried out at the moment of the transverse movement of the products during their transfer.

Thus, the invention relates to a method for transferring products to or from a collecting surface within a line for the continuous processing of said products, wherein:
a first transit zone bordering one edge of said collecting surface is fed longitudinally with at least one file of products by an entry conveyor;
a second transit zone supplies at least one file of products longitudinally to an exit conveyor, said second transit zone bordering the opposite edge of said collecting surface;
at least one column of products is transferred, by being pushed transversely, from said first transit zone to said collecting surface, or from said collecting zone to said second transit zone, by means of a transfer tool provided with a plurality of members extending longitudinally;
a member is disposed on either side of each column of products; characterized in that, at the moment of transfer, each column of products is gripped by said members being moved toward one another, at least one first member being fixed, while at least one second member is mounted in a movable manner with respect to said fixed first member.

According to additional features, which are in no way limiting, within such a transfer method, each column may be gripped before said transverse push, while the products are at a standstill.

Each column of products may be gripped during said transverse push.

At least two members may be mounted in a movable manner symmetrically with respect to said fixed first member.

The members may be moved in translation in a parallel manner to one another in a horizontal plane.

The members may be connected together by way of at least two link rods, said link rods being mounted in a pivotable manner on each member, so as to form at least one four-bar linkage of the deformable parallelogram type.

When gripped, each column of products may be spaced apart from said members by a distance less than a functional clearance.

Said distance may be less than five millimeters, preferably between zero and three millimeters.

The invention also relates to a device for transferring products to or from a collecting surface, in order to implement said transfer method.

Such a transfer device comprises:
a collecting surface;
a first transit zone extending at least partially along one edge of said collecting surface;
an entry conveyor for feeding products in at least one file to said first transit zone;
a second transit zone extending at least partially along the opposite edge of said collecting surface;
an exit conveyor that is supplied with products by said second transit zone;
at least one transversely movable transfer tool that moves each column of products, by pushing them transversely, to or from said collecting surface, from said first transit zone or to said second transit zone, respectively, said transfer tool comprising at least two members that are spaced apart in parallel, so as to flank each column of products; characterized in that it comprises means for actuating said members, from a spaced-apart position to a close-together position, over a closing travel ensuring, in the close-together position, a distance less than a functional clearance between said members and each column of products, at least one first member being fixed, while at least one second member is mounted in a movable manner with respect to said fixed first member.

According to further additional features, which are not limiting, within such a transfer device, each tool may comprise at least two shafts that are mounted in a pivotable manner at each member and are rotatable at the bottom with respect to said tool, so as to constitute a four-bar linkage forming at least one deformable parallelogram.

Each member may be in the form of a longitudinally oriented vertical plate.

Further features and advantages of the invention will become apparent from the following detailed description of the nonlimiting embodiments of the invention, with reference to the appended figures, in which.

The present invention relates to the transfer of products 1 to or from a collecting surface 2, within a line for the continuous processing of said products 1.

Figure 1:
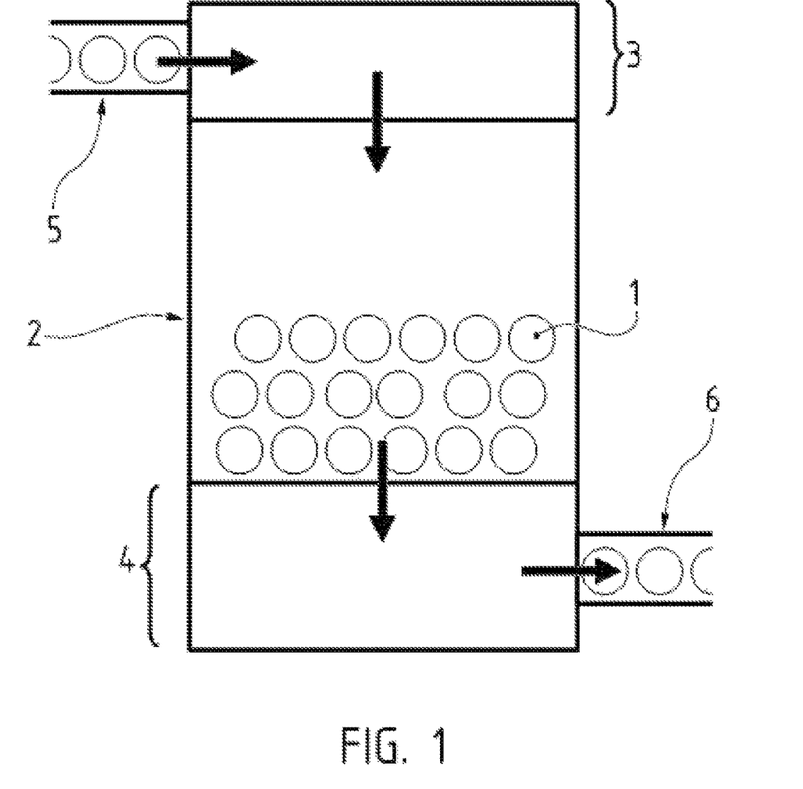
FIG. 1 schematically shows an elevation view of an outline diagram of a nonlimiting example of a collecting surface flanked by a first and a second transit zone for products conveyed by an upstream entry conveyor and a downstream exit conveyor.
Figure 2:
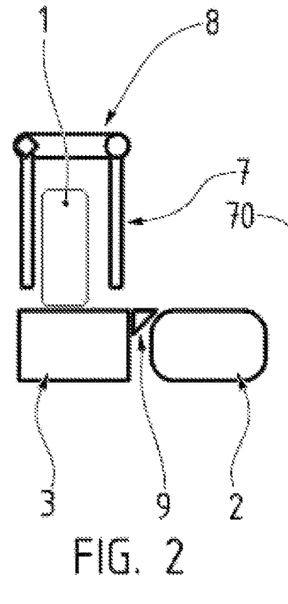
FIG. 2 schematically shows a simplified view in vertical section, showing a column of products before it is gripped, only one product being visible, said column being positioned in a transit zone, formed in particular by a conveyor, adjacent to the slider bed and to the collecting surface.

In particular, as shown in FIG. 1, said collecting surface 2 is flanked by a first transit zone 3 and a second transit zone 4. The first transit zone 3 extends along an entry edge of the collecting surface 2, while the second transit zone 4 borders the opposite exit edge thereof. The zones 3, 4 therefore extend in a parallel or substantially parallel manner.

In the direction of circulation of the products, from upstream to downstream, the first transit zone 3 is fed with at least one file of said products 1, preferably in single file, in a frontal manner by an entry conveyor 5. Said entry conveyor 5 receives the file of products 1 from a station situated upstream within the processing line. In the nonlimiting example in FIG. 1, the single-file feed is from the left to the right, longitudinally or parallel to the entry edge of said collecting surface 2. Columns of products 1 of each file are then transferred by a transverse movement from the first transit zone 3 to the collecting surface 2. The movement is therefore effected transversely with respect to the longitudinal direction of travel of the products feeding the first transit zone 3. In other words, the columns of products 1 are moved in a generally horizontal plane, preferably, although not limitingly, orthogonally with respect to their frontal direction of supply, so as to cross the edges separating the first transit zone 3 and the collecting surface 2 (as can be seen in FIG. 1, downwardly from the top). The columns that have thus been transferred are then conveyed over the collecting surface 2 to the second transit zone 4. This conveying can be effected by suitable means, accompanying the movement of the columns, for example by way of an endless belt conveyor that makes up said collecting surface 2. With reference to FIG. 1, said conveying takes place downwardly from the top. Transfer is thus effected from the collecting surface 2 to the second transit zone 4, still by way of a transverse movement, that is to say preferably orthogonally, with respect to the direction in which the products are fed at the entry conveyor 5 (as can be seen in FIG. 1, downwardly from the top). The columns then cross the edges separating the collecting surface 2 and the second transit zone 4. The latter then supplies at least one file of products 1 longitudinally to an exit conveyor 6 (as can be seen in FIG. 1, from left to right). Said exit conveyor 6 then sends the products 1 to a module situated downstream in the processing line.

In sum, the transverse movement during each transfer of products 1 comprises at least one component perpendicular to the longitudinal direction, namely the direction of supply along the entry conveyor 5.

Furthermore, the transverse movement during each transfer of one or more columns of products 1 is effected by transverse pushing. For this purpose, dedicated members 7 are disposed on either side of each column. Each product 1 in a column is then flanked by two members 7.

Such members 7 are designed to come into contact with the products 1 in one and the same column and allow them to be pushed simultaneously. Furthermore, it is at least one member 7 situated upstream that effects the push, while the other member 7, situated opposite, holds the products 1 during their transverse movement, limiting the risk of them falling over.

For this purpose, each member 7 may be in the form of an elongate element, preferably in the form of a plate extending vertically and longitudinally. The length of each member 7 is configured depending on the dimensions of its transit zone 3, 4 and of the collecting surface 2, in particular in order to sweep along all or part of their length, ensuring that the products 1 are moved transversely. Consequently, the members 7 are mounted on means that ensure their movement, namely a transfer tool 8 that is at least movable transversely, still with respect to the direction in which the products 1 are fed at the entry. Said members 7 can be mounted in a suspended manner in the lower part of their transfer tool 8. The transfer tool 8 travels above the transit zones 3, 4 and the collecting surface 2. In particular, one transfer tool 8 is provided at the first transit zone 3 and another transfer tool 8 is provided at the second transit zone 4, each having dedicated movement cycles and travels.

Each transfer tool 8 is also provided to be vertically movable, ensuring, for the one part, the raising of the members to a high position above the transit zone 3, 4 and the collecting surface 2, at a sufficient height for the bottom of the members 7 thus lifted not to come into contact with the top of the products 1. For the other part, the vertical movability of the transfer tool 8 allows it to be lowered from said high position to a low position in which two members 7 flank a column of products 1.

Furthermore, two members 7 are mounted in a spaced-apart manner, at a width depending on the format of products 1, in particular on their diameter or width. This width corresponds in principle to the diameter of the products 1 processed, plus a functional clearance, in order to allow said members 7 to be raised and lowered without coming into contact with the products 1. This functional clearance is made up of a first distance between the member 7 and the wall of the products 1 that are situated upstream and a second distance between the opposite member 7 and the opposite wall of said products 1 (i.e. the ones situated downstream).

Such a functional clearance can be provided to be adjustable, manually or automatically, at the start of production and depending on the dimensions of the products 1. Said functional clearance is generally at least five millimeters and at most thirty millimeters (between 5 mm and 30 mm). Preferably, the functional clearance is between ten and twenty millimeters (between 10 mm and 20 mm).

Advantageously, according to the invention, at the moment of transfer, each column of products 1 is gripped by said members 7 being moved toward one another. In other words, with each column being flanked by a pair of two members 7, said members 7 are moved toward one another.

More specifically, at the end of travel, the members 7 are spaced apart by a distance less than said functional clearance. In the close-together position of the members 7, this distance is generally less than five millimeters (5 mm), namely strictly less than 5 mm. Preferably, this distance is between zero and three millimeters (between 0 mm and 3 mm).

Moreover, when said distance is zero, the members 7 come into contact with the walls of the products 1. It will be noted that this contact is effected without any force being applied to the integrity of the products 1, without pinching, i.e. without deforming the container that constitutes each of said products 1.

Consequently, this gripping by the members 7 makes it possible to hold the products 1 for their transfer, minimizing or leaving no space liable to allow said products 1 to shift. Moreover, in the case of the products 1 being gripped on either side, the moving together ensures that each column is aligned, namely longitudinally, in the feeding direction.

Said moving together of two members 7 is effected in a relative manner, meaning that the movement of said members 7 together can be effected in a frame of reference centered on the products 1 to be gripped. In particular, one of the members 7 moves with respect to the other. This movement is possible because one of the members 7 is mounted in a movable manner with respect to the transfer tool 8 that supports them underneath.

Figure 3:
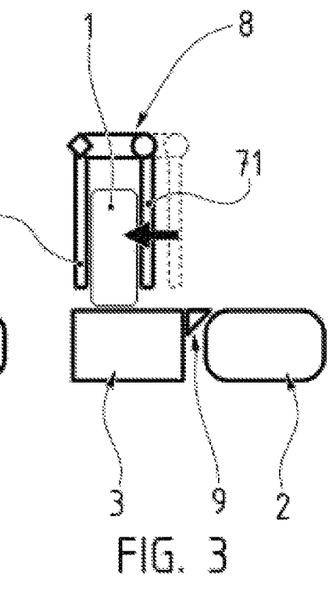
FIG. 3 schematically shows a view similar to FIG. 2, in which said gripping is effected before the products are transferred.

According to a first embodiment, at least one first member 70 is fixed, while at least one second member 71 is mounted in a movable manner with respect to said fixed first member 70. Such a configuration can be seen in FIGS. 3 and 4, which show a transfer tool 8 equipped with two members 7: the movement of the movable member 71 situated on the right is effected toward the fixed member 70 on the left.

Figure 5:
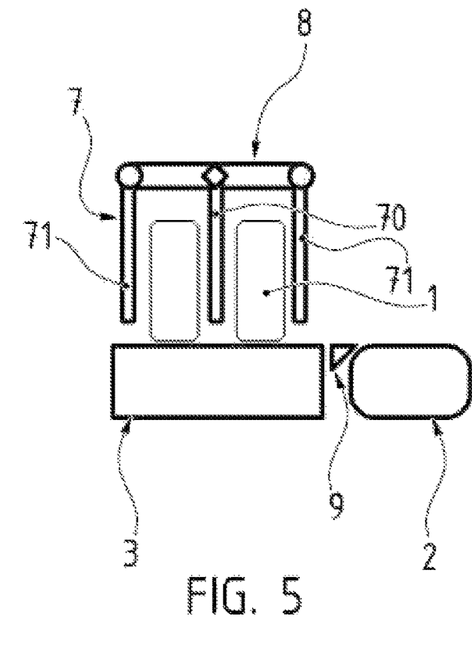
FIG. 5 schematically shows a simplified view in vertical section, showing two columns of products before they are gripped, one product in each column being visible, said columns being positioned in a transit zone, formed in particular by a conveyor, adjacent to the slider bed and to the collecting surface.
Figure 6:
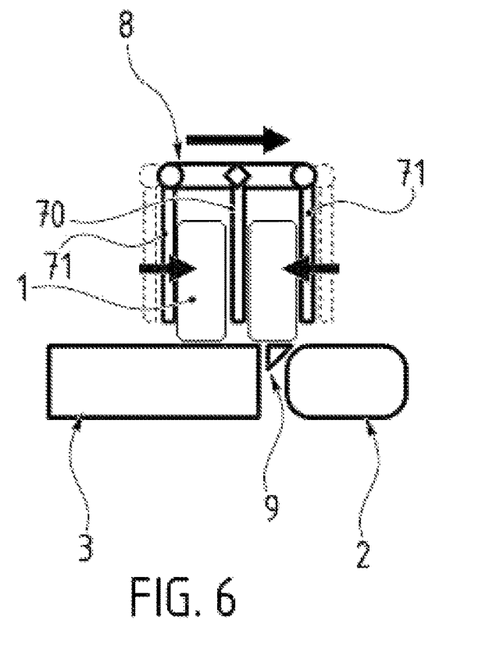
FIG. 6 schematically shows a view similar to FIG. 5, in which said gripping is effected symmetrically at the moment the products are transferred.

According to another configuration, generally, when the transfer tool 8 has more than two members 7, in particular three members, as can be seen in FIGS. 5 and 6, the fixed first member 70 can be situated at the center, while two other, movable members 71 are located on either side of said fixed first member 70. Consequently, the two other members 70 are mounted in a movable manner symmetrically with respect to said fixed first member 70. Moreover, the travels of the movable members 71 can be symmetrically similar.

Figure 9:
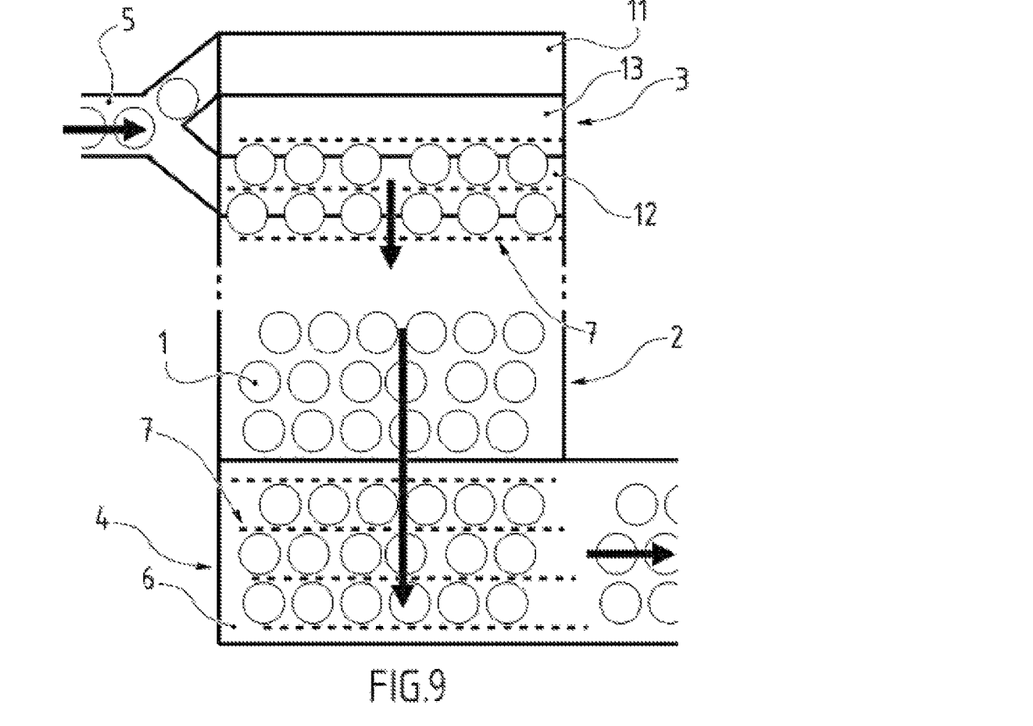
FIG. 9 schematically shows a simplified elevation view of a third embodiment, showing a first transit zone similar to the one in FIG. 8, and a second transit zone formed by the exit conveyor and designed to receive three columns of products.

Additional movable members 71 may be envisioned, in order to flank and grip additional columns. FIG. 9 shows, at the entry, three members 7, two of which are movable symmetrically with respect to a central member, while, at the exit, a different system comprises four members 7 that are mounted in a movable manner and grip three columns at the second transit zone 4.

Preferably, the movement of the members 7 toward one another is effected by a parallel movement in translation in a horizontal plane. In other words, each movable member 71 remains vertical and parallel as it moves toward the other, fixed 70 or movable 71 members.

In order to obtain such a movement of said members 7, a first, nonlimiting, embodiment provides for said members 7 to be connected together by way of at least two shafts or link rods, said link rods being mounted in a pivotable manner on each member 7, so as to form at least one four-bar linkage of the deformable parallelogram type. Moreover, said link rods are mounted and actuated in rotation by said transfer tool 8.

More specifically, each tool 8 comprises at least two shafts or link rods that are mounted in a pivotable manner at each member 7 and rotatable at the bottom with respect to said tool 8.

According to another embodiment, said members 7 can be mounted on mutually parallel slides that extend in a transverse direction, thereby ensuring the transverse movement in translation of the members 7. The actuation along such slides can also be realized by way of said transfer tool 8, in particular by suitable drive means.

Furthermore, the movement of the members 7 toward one another takes place at the moment of transfer of the products 1. In particular, said movement of the members 7 toward one another can be effected at the start of or during the transfer from the first transit zone 3 to the collecting surface 2, or from said collecting surface 2 to the second transit zone 4. For this purpose, each column of products 1 can be gripped before said transverse push, while said products 1 are at a standstill, as shown for example in FIG. 3.

Figure 4:
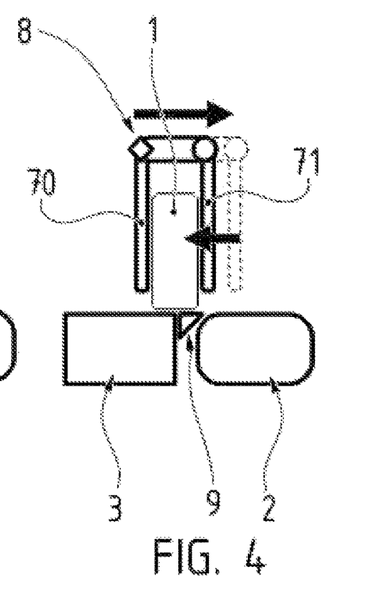
FIG. 4 schematically shows a view similar to FIG. 2, in which said gripping is effected while the products are being transferred.

Alternatively, as can be seen in FIGS. 4 and 6, each column of products 1 can be gripped during said transverse push, while each column is moving. This advantageously results in a higher rate.

It will be noted that the gripped movement of the members 7 can also be effected in several movement steps by a plurality of successive transverse pushes within the transit zone 3, 4, and between said transit zone 3, 4 and the collecting surface. Such a possibility is envisioned for example when a transit zone 3, 4 is provided with a plurality of separate surfaces that are intended to receive and/or transfer a plurality of columns of products 1.

At least one slider bed 9 can be positioned, along contiguous edges, between each transit zone 3, 4 and the collecting surface 2. Such a slider bed 9 constitutes a fixed, substantially flat, surface flush with the surfaces situated on either side. This slider bed 9 is intended to close the dip between the edge of the transit zone 3, 4 and the adjacent edge of the collecting surface 2, forming a round portion in particular when this surface 2 is formed by an endless belt conveyor running around rollers. Each slider bed 9 thus fills this dip and this rounded portion, forming a fixed, flush surface, in order to prevent the products 1 that are moved at this location being unbalanced and falling over, or even breaking. Such a slider bed 9 can be seen in the examples in FIGS. 2 to 6.

Each transit zone 3, 4 can be configured differently, depending in particular on the number of columns transferred, in order to ensure the continuity of the flow in spite of the steps of transferring one or more of said columns by way of a transverse push.

Several possible configurations of transit zones 3, 4 will now be described in detail, in a nonlimiting manner.

Figure 7:
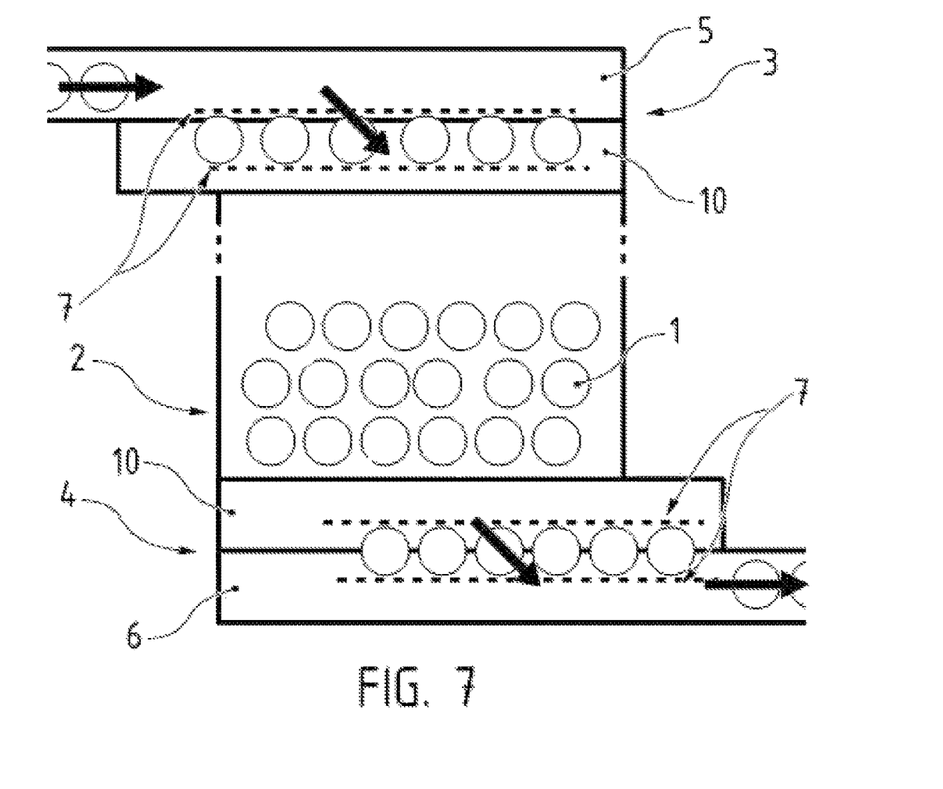
FIG. 7 schematically shows a simplified elevation view of a first embodiment, showing an entry conveyor feeding products longitudinally to a first transit zone, and an exit conveyor supplied by a second transit zone, in which zones a double transfer of products is effected, by successive movements.

According to the example shown in FIG. 7, the first transit zone 3 is formed in part by the entry conveyor 5, which then extends along all or part of the length of the entry edge of the collecting surface 2. Similarly, the second transit zone 4 is formed in part by the exit conveyor 6, which also extends longitudinally and parallel to the opposite edge of said collecting surface 2. Moreover, each transit zone 3, 4 is provided with an intermediate conveyor 10, extending in a parallel and longitudinal manner, between the collecting surface 2 and said entry conveyor 5 or said exit conveyor 6.

Each intermediate conveyor makes it possible to receive a column of products 1 during a first transfer step within said transit zone 3, 4. In particular, in the first transit zone 3, an intermediate conveyor 10 is situated between the entry conveyor 5 and the collecting surface 2, said intermediate conveyor 10 receiving a first column from the file of products 1 supported by the entry conveyor 5. This first column is sent toward said intermediate conveyor 10 during a first transfer step by an angled transverse push, while another column of the file continues to progress along said entry conveyor 5. For this purpose, the intermediate conveyor 10 is set in motion, in particular in a manner synchronized with the entry conveyor 5. This step can be seen particularly in FIG. 7. Once the first column has been moved onto the intermediate conveyor 10, the latter is slowed down, or even stopped, in order to carry out another transfer step by way of an orthogonal transverse push from said intermediate conveyor 10 to the collecting surface 2. Thus, the entry conveyor 5 maintains its operating speed during the transfer of the products 1, thereby ensuring continuous circulation of the products 1, while the intermediate conveyor 10 operates at a variable speed, in particular in a mode running at the same speed as the entry conveyor 5/a stopped mode.

In the second transit zone 4, the configuration is similar, except that a column is moved transversely and orthogonally during a first transfer step from the collecting surface 2 to the intermediate conveyor 10, situated between the collecting surface 2 and the exit conveyor 6, thus slowed down, or at a standstill. Next, it is set in motion, in particular in a manner synchronized with the exit conveyor 6, and this column is transferred transversely at an angle during another transfer step to said exit conveyor 6, which operates in principle at a constant speed, thereby making it possible to ensure a continuous flow of products 1.

In this configuration, each transfer tool 8 is equipped with two members 7 that grip a column of products 1 during one and/or the other of the abovementioned transfer steps.

At the entry, this gripping is effected preferably at the moment of transfer from the entry conveyor 5 to the intermediate conveyor 10 after the start of the angled transverse movement, or from the intermediate conveyor 10 to the collecting surface 2, after the start of the orthogonal transverse movement so as to carry out this step in concurrent operation time. Alternatively, gripping may take place at the moment of transfer from the intermediate conveyor 10 to the collecting surface 2 but before the start of the transverse movement.

At the exit, gripping may be effected before or after the start of the orthogonal transverse movement from the collecting surface 2 to the intermediate conveyor 10, preferably after. Alternatively, it can be carried out during the angled transverse movement from said intermediate conveyor 10 to the exit conveyor 6. In the latter case, the members 7 can be released and moved apart as soon as the transferred products 1 are supported by said exit conveyor 6.

Figure 8:
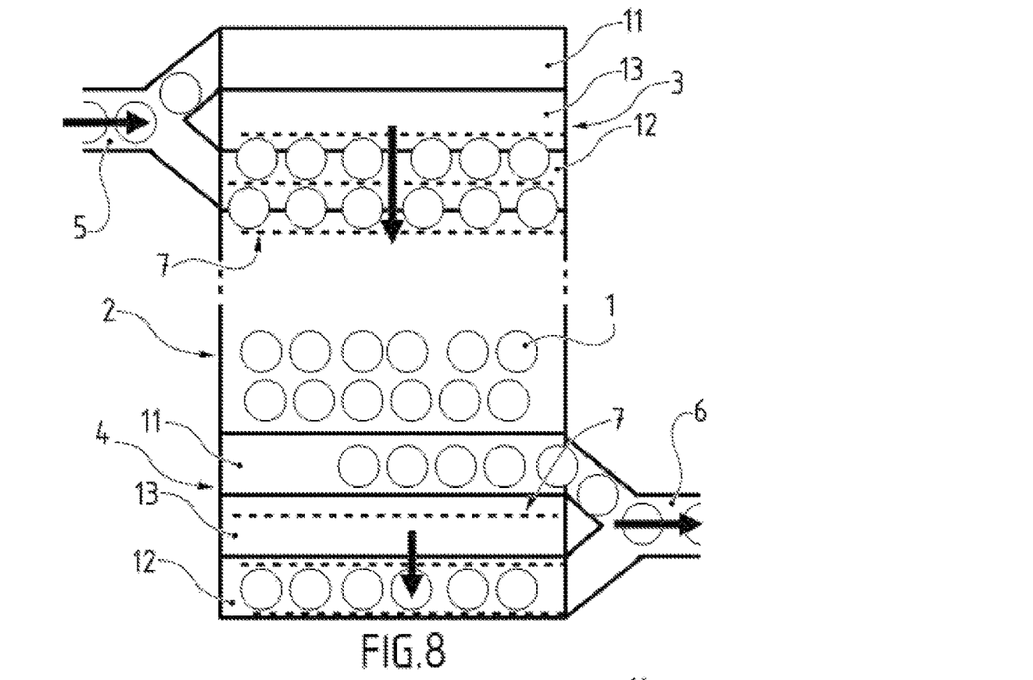
FIG. 8 schematically shows a simplified elevation view of a second embodiment, showing an entry conveyor separating the flow of products for feeding the first transit zone, which is provided with two conveyors separated by a stationary plate, it being similar at the exit for the second transit zone.

According to the example shown in FIG. 8, the transit zones 3, 4 comprise a first conveyor 11 and a second conveyor 12, which extend in parallel and longitudinally. These conveyors 11, 12 are separated by a stationary plate 13 with a sufficient width to receive the products 1 in a column.

According to this configuration, the entry conveyor 5, which operates continuously, alternately feeds the first and the second conveyor 11, 12 of the transit zone 3, which operate in principle in an alternating manner. In particular, the first conveyor 11 of the first transit zone 3 is moving, in particular at the same speed as the conveyor 5, while it is being fed with a file of products 1 by the entry conveyor 5 until a first column is formed. Subsequently, the file is oriented toward the second conveyor 12, while the first conveyor 11 is stopped. A first step of transferring said first column can then be effected by transverse movement, orthogonally, from said first conveyor 11 to the stationary plate 13 while a second column is being formed on the operating conveyor 12. Once a second column has been formed on said second conveyor 12, the latter is stopped and the feed alternates again to the first conveyor 11, which is now empty and is started up again, in particular in a manner synchronized with the entry conveyor 5. The first and second columns can then be transferred simultaneously from the stationary plate 13 and the second conveyor 12 to the collecting surface 2, by being moved by a transverse push, orthogonally. During this time, a new first column is formed on the conveyor 11.

A similar operation is carried out in the second transit zone 4. A first and a second column are moved simultaneously from the collecting surface 2 respectively to a first conveyor 11, which is in principle at a standstill, and a stationary plate 13 during a first transfer step. The first column is sent by the first conveyor 11, which has been started up, in particular at the same speed as the exit conveyor 6, to this conveyor 6, which operates normally continuously and at a constant speed, while the second column is moved by a transverse push to the second conveyor 12, which is in principle at a standstill, where it will be sent to the outlet conveyor 6 after said first column, in the continuation thereof, by starting up said second conveyor 12, in particular in a synchronized manner.

In this configuration, each transfer tool 8 can be equipped with three members 7 that grip the two columns of products 1 at the moment of transfer, at the entry, from the stationary plate 13 and the second conveyor 12 to the collecting surface 2, or, at the exit, from said collecting surface 2 to the first conveyor 11 and said stationary plate 13. Gripping can also optionally be effected at the moment of transfer, at the entry, of the first column from the first conveyor 11 to the stationary plate 13, or, at the exit, from the stationary plate 13 to said second conveyor 12.

Each gripping operation can be effected during transfer, before the start of the movement, when the products 1 do not move, the corresponding conveyors being at a standstill, or preferably during the transverse movement, just after the start of the transverse push, in order to carry out this step in concurrent operation time.

According to the example shown in FIG. 9, the entry conveyor 5 feeds a file of products 1 to a first transit zone 3 similar to the one in the previous example. However, at the exit, the second transit zone 4 is formed entirely, across its entire width, by the exit conveyor 6. Moreover, said exit conveyor 6 is designed to receive several columns of products 1, in particular, in a nonlimiting manner, three columns in the example shown. Consequently, the three columns are transferred simultaneously from the collecting surface 2 to the outlet conveyor 6.

It will thus be noted that the exit conveyor 6 can be made up of at least two belt sections, which are driven separately, so as, for the one part, to stop a first section next to the exit edge of the collecting surface 2 in order to transfer the columns of products 1, while another section, which has previously been loaded with products 1, moves toward a station situated downstream to offload them there. Once the transfer has been effected, the first section is set in motion so as to catch up with said other section. The latter, once empty, will return with an increased speed until it arrives next to the exit edge of the collecting surface 2, where it stops to receive the following columns, and so on. Just like the other configurations of transit zones 3, 4 descried above, such a device makes it possible to deliver a continuous flow of products 1 while the transfer is carried out sequentially.

In this configuration, the transfer tool 8 situated at the exit in the second transit zone 4 is equipped with four members 7 that grip said three columns at the moment of said transfer. Such gripping can take place before the start of the transverse movement, but preferably after the start of the transverse movement, in order to carry out this action in concurrent operation time.

Moreover, once the transfers of each column have been effected, the members 7 are released, removing all gripping, until they return to their initial position, in a spaced-apart manner compared with the previous gripped close-together position, at the required functional clearance. This moving apart, for the one part, allows the products 1 to be released without rubbing along the walls of said members situated on either side of each column and, for the other part, allows said members 7 to be raised and then lowered if this operation is required.

Thus, the moving together of the members 7 at the moment of transfer of a column of products 1 in the transit zones 3, 4 situated at the entry and exit of a collecting surface 2 ensures that said products 1 are held better, limiting the risks of shifting or unbalancing. This gripping also makes it possible to increase the production rates, by increasing the accelerations during the movements transferring the products 1, but especially by having greater decelerations, without any risk of the products 1 falling over. Specifically, the products 1 are then held on either side until they are stopped at the end of transfer by transverse movement.

Such gripping also avoids any risk of sticking of the bottom of the products 1, especially for cartons having a bottom with a parallelepipedal base, at the flush junctions between the different surfaces, in particular with each slider bed 9. Moreover, the movement of a movable member 71 with respect to a fixed member 70 simplifies the management of movements, while ensuring perfect alignment of the products transferred with the aid of such a device.

The invention claimed is:

1. A method for transferring products (1) to or from a collecting surface (2) within a line for the continuous processing of said products (1), wherein:

feeding longitudinally by an entry conveyor (5) at least one file of products (1) to a first transition zone (3) bordering one edge of the collecting surface (2);

supplying longitudinally to an exit conveyor (6) at least one file of products (1) to a second transition zone (4) bordering the opposite edge of said collecting surface (2);

transferring at least one column of products (1), by pushing transversely with respect to the longitudinal feed, from said first transit zone (3) to said collecting surface (2), or from said collecting surface (2) to said second transition zone (4), by means of a transfer tool (8) provided with a plurality of members (7) extending longitudinally, wherein a member (7) is disposed on either side of each column of products (1); and gripping, at the moment of transfer, each column of products (1) by said members (7) moving towards one another, wherein at least one first member (70) is fixed, while at least one second member (71) is mounted in a laterally movable manner with respect to said fixed first member (70).

2. The transfer method as claimed in claim 1, wherein gripping occurs for each column before said transverse pushing, while the products (1) are at a standstill.

3. The transfer method as claimed in claim 2, wherein the moving of members (7) occurs in translation in a parallel manner to one another in a horizontal plane.

4. The transfer method as claimed in claim 2, wherein, during gripping, each column of products (1) is spaced apart from said members (7) by a distance less than a functional clearance.

5. The transfer method as claimed in claim 1, wherein gripping occurs for each column of products (1) during said transverse pushing.

6. The transfer method as claimed in claim 5, wherein the moving of members (7) occurs in translation in a parallel manner to one another in a horizontal plane.

7. The transfer method as claimed in claim 5, wherein, during gripping, each column of products (1) is spaced apart from said members (7) by a distance less than a functional clearance.

8. The transfer method as claimed in claim 1, wherein at least two members (71) are mounted in a movable manner symmetrically with respect to said fixed first member (70).

9. The transfer method as claimed in claim 8, wherein the moving of members (7) occurs in translation in a parallel manner to one another in a horizontal plane.

10. The transfer method as claimed in claim 8, wherein, during gripping, each column of products (1) is spaced apart from said members (7) by a distance less than a functional clearance.

11. The transfer method as claimed in claim 1, wherein the moving of members (7) occurs in translation in a parallel manner to one another in a horizontal plane.

12. The transfer method as claimed in claim 11, wherein the members (7) are connected together by way of at least two link rods, said link rods being mounted in a pivotable manner on each member (7), so as to form at least one four-bar linkage of the deformable parallelogram type.

13. The transfer method as claimed in claim 12, wherein, during gripping, each column of products (1) is spaced apart from said members (7) by a distance less than a functional clearance.

14. The transfer method as claimed in claim 11, wherein, during gripping, each column of products (1) is spaced apart from said members (7) by a distance less than a functional clearance.

15. The transfer method as claimed in claim 1, wherein, during gripping, each column of products (1) is spaced apart from said members (7) by a distance less than a functional clearance.

16. The transfer method as claimed in claim 15, wherein said distance is less than five millimeters.

17. A device for transferring products (1) to or from a collecting surface (2), within an industrial line for the continuous processing of said products (1), said transfer device comprising:
- a collecting surface (2);
- a first transit zone (3) extending at least partially along one edge of said collecting surface (2);
- an entry conveyor (5) for feeding products (1) in at least one file to said first transit zone (3);
- a second transit zone (4) extending at least partially along the opposite edge of said collecting surface (2);
- an exit conveyor (6) that is supplied with products (1) by said second transit zone (4);
- at least one transversely movable transfer tool (8) that moves each column of products (1), by pushing them transversely, to or from said collecting surface (2), from said first transit zone (3) or to said second transit zone (4), respectively, said transfer tool (8) comprising at least two members (7) that are spaced apart in parallel, so as to flank each column of products (1);
- wherein it comprises means for actuating said members (7), from a spaced-apart position to a close-together position, over a closing travel ensuring, in the close-together position, a distance less than a functional clearance between said members (7) and each column of products (1), at least one first member (70) being fixed, while at least one second member (71) is mounted in a laterally movable manner with respect to said fixed first member (70).

18. The transfer device as claimed in claim 17, wherein each tool (8) comprises at least two shafts that are mounted in a pivotable manner at each member (7) and are rotatable at the bottom with respect to said tool (8), so as to constitute a four-bar linkage forming at least one deformable parallelogram.

19. The transfer device as claimed in claim 18, wherein each member (7) is in the form of a longitudinally oriented vertical plate.

20. The transfer device as claimed in claim 17, wherein each member (7) is in the form of a longitudinally oriented vertical plate.

* * * * *

UNITED STATES PATENT AND TRADEMARK OFFICE
CERTIFICATE OF CORRECTION

| | |
|---|---|
| PATENT NO. | : 11,511,946 B2 |
| APPLICATION NO. | : 17/057160 |
| DATED | : November 29, 2022 |
| INVENTOR(S) | : Gehin et al. |

It is certified that error appears in the above-identified patent and that said Letters Patent is hereby corrected as shown below:

On the Title Page

Item (71) and Item (73), delete "CONVERING SOLUTIONS," and replace with --CONVEYING SOLUTIONS--

Signed and Sealed this
Fifteenth Day of August, 2023

Katherine Kelly Vidal
*Director of the United States Patent and Trademark Office*